Patented Nov. 26, 1940

2,223,230

UNITED STATES PATENT OFFICE 2,223,230

ARC WELDING FLUX

Thomas C. R. Shepherd, Hale Barns, England, assignor to General Electric Company, a corporation of New York No Drawing. Application June 25, 1938, Serial No. 215,927. In Great Britain July 13, 1937

2 Claims. (Cl. 148—26)

My invention relates to arc welding fluxes.

The flux of my invention is particularly suited for use in arc welding steels having a high chromium content, such as stainless steels, either of the ordinary composition including 18% chromium and 8% nickel, or of special composition with additions of titanium, columbium, silicon, molybdenum or tungsten, steels of the rustless iron type containing up to 12% chromium, and steels generally referred to as "heat resistant steels" in which the nickel and chromium contents are high. It may be applied to the work or associated with the welding electrode. In metallic arc welding, it is preferably applied as a coating to the electrode.

The arc welding flux of my invention includes ferro-titanium in considerable quantity and of low carbon content, preferably under .2% together with calcium carbonate also in considerable quantity, and asbestos, white or blue, in either powdered or spun form. When asbestos is used in the spun form, it may be applied as a wrapping to the electrode. In addition to asbestos, certain other mineral silicates are desirable as constituents of the flux. These additional silicates may be clay, feldspar, and sodium silicate. A certain amount of sodium silicate is useful in solid form, ground up and mixed with the other constituents independently of any liquid sodium silicate which may be used as a binder. Titanium dioxide may advantageously also be added as a constituent of the flux. In place of using sodium silicate as a binder, other binders may be used such, for example, as the organic silicates known by the trade name of "Silicon-esters." The carbon content of the flux is kept as low as possible.

A flux of the composition given below has been found to give good results. The proportions recited are given by weight and may be varied within plus or minus 5% without substantially affecting the qualities of the flux.

| | Parts |
|---|---|
| Ferro-titanium | 13 |
| Calcium carbonate | 20 |
| Asbestos | 10 |
| Clay | 5 |
| Feldspar | 15 |
| Solid sodium silicate | 5 |
| Titanium dioxide | 10 |

These ingredients are preferably in powdered form and combined to form a homogeneous mixture. By using a binder such as liquid sodium silicate, this mixture may be made into a paste which may be applied as a coating to electrodes which are preferably used after the coating has dried. The flux is preferably applied as a heavy coating. For example, a finished electrode having a metallic core of .160 inch in diameter may be coated with this flux so that its finished overall diameter is about .222 inch. This gives a ratio by weight of metallic core to flux of about three. These proportions, however, will vary with the composition of the metallic core and with the precise composition of the flux employed as a coating therefor.

Although I prefer to use my flux as a coating on metallic arc welding electrodes, it is apparent that as an arc welding flux it may be applied in other manners to the electrode or to the work. Either alternating or direct current may be used when welding with my flux.

What I claim as new and desire to secure by Letters Patent of the United States is:

1. An arc welding flux for use in welding steels having a high chromium content, said flux having substantially the following composition in which the carbon content is kept as low as possible:

| | Parts by weight |
|---|---|
| Ferro-titanium (carbon content preferably under .2%) | 13 |
| Calcium carbonate | 20 |
| Asbestos | 10 |
| Clay | 5 |
| Feldspar | 15 |
| Solid sodium silicate | 5 |

2. An arc welding flux for use in welding steels having a high chromium content, said flux having substantially the following composition in which the carbon content is kept as low as possible:

| | Parts by weight |
|---|---|
| Ferro-titanium (carbon content preferably under .2%) | 13 |
| Calcium carbonate | 20 |
| Asbestos | 10 |
| Clay | 5 |
| Feldspar | 15 |
| Solid sodium silicate | 5 |
| Titanium dioxide | 10 |

THOMAS C. R. SHEPHERD.